US012710856B1

(12) United States Patent
Smalley et al.

(10) Patent No.: US 12,710,856 B1
(45) Date of Patent: Aug. 18, 2026

(54) ENABLING OPERATION TRACKING USING GRAPHICAL USER INTERFACES

(71) Applicant: Citibank, N.A., New York, NY (US)

(72) Inventors: Matthew Smalley, Gravesend (GB); Oran Levin, Jersey City, NJ (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/555,840

(22) Filed: Mar. 3, 2026

(51) Int. Cl.
*G06F 3/0482* (2013.01)
*G06F 3/04842* (2022.01)
*G06F 9/451* (2018.01)
*G06Q 10/063* (2023.01)

(52) U.S. Cl.
CPC ........ *G06F 3/0482* (2013.01); *G06F 3/04842* (2013.01); *G06F 9/451* (2018.02); *G06Q 10/063* (2013.01)

(58) Field of Classification Search
CPC .... G06F 3/0482; G06F 3/04842; G06F 9/451; G06Q 10/063
See application file for complete search history.

(56) References Cited

U.S. PATENT DOCUMENTS 7,788,599 B2 * 8/2010 Michaud ............... G06F 3/0482 715/810
7,831,931 B2 * 11/2010 Klein .................... G06F 3/0481 715/744
8,365,094 B2 * 1/2013 Sato ...................... G06F 3/0482 715/767
8,966,388 B2 * 2/2015 White .................... G06Q 10/06 715/854
10,447,555 B2 * 10/2019 Fletcher ........... G06Q 10/06393
2005/0114201 A1 * 5/2005 Walsh .................... G06Q 10/10 709/200
2024/0211896 A1 * 6/2024 Telang .................. G06Q 10/20

OTHER PUBLICATIONS

Lucija Bakić, Top 13 Operations Management Software (Paid & Free) in 2026, https://productive.io/blog/best-operations-management-software/, Dec. 15, 2025 (Year: 2025).*

* cited by examiner

*Primary Examiner* — Nicholas Ulrich
(74) *Attorney, Agent, or Firm* — Ashurst Perkins Coie US LLP

(57) ABSTRACT

Systems and methods for enabling operation tracking using graphical interfaces are disclosed. The system receives operational files from multiple operation management systems and transforms operations from native to standard encoding. A first graphical interface displays selectable operational file indicators. Upon user selection of a file, the system identifies the corresponding operation management system and generates a second interface with selectable operational indicators. When a user selects an operation indicator, the system determines available functions based on the operation management system. A third interface displays operational details and distinguishes between available and unavailable functions through selectable and non-selectable indicators. This approach enables users to efficiently manage operations across different systems through a unified interface that adapts based on operational context.

20 Claims, 7 Drawing Sheets

300

| Operation Management System ID (303) | Available Functions (306) | Function Data (309) |
| --- | --- | --- |
| 121 | <Function_1><br><Function_2><br><Function_3> | <Data_1><br><Data_2><br><Data_3> |
| 122 | <Function_1><br><Function_4><br><Function_5> | <Data_1><br><Data_4><br><Data_5> |
| 124 | <Function_2><br><Function_3><br><Function_4> | <Data_2><br><Data_3><br><Data_4> |

| Selected Entry ID | Option ID | Data |
| --- | --- | --- |
| 1 | Option_1 | Param_Values_1 |
| 2 | Option_2 | Param_Values_2 |
| 3 | Option_3 | Param_Values_3 |

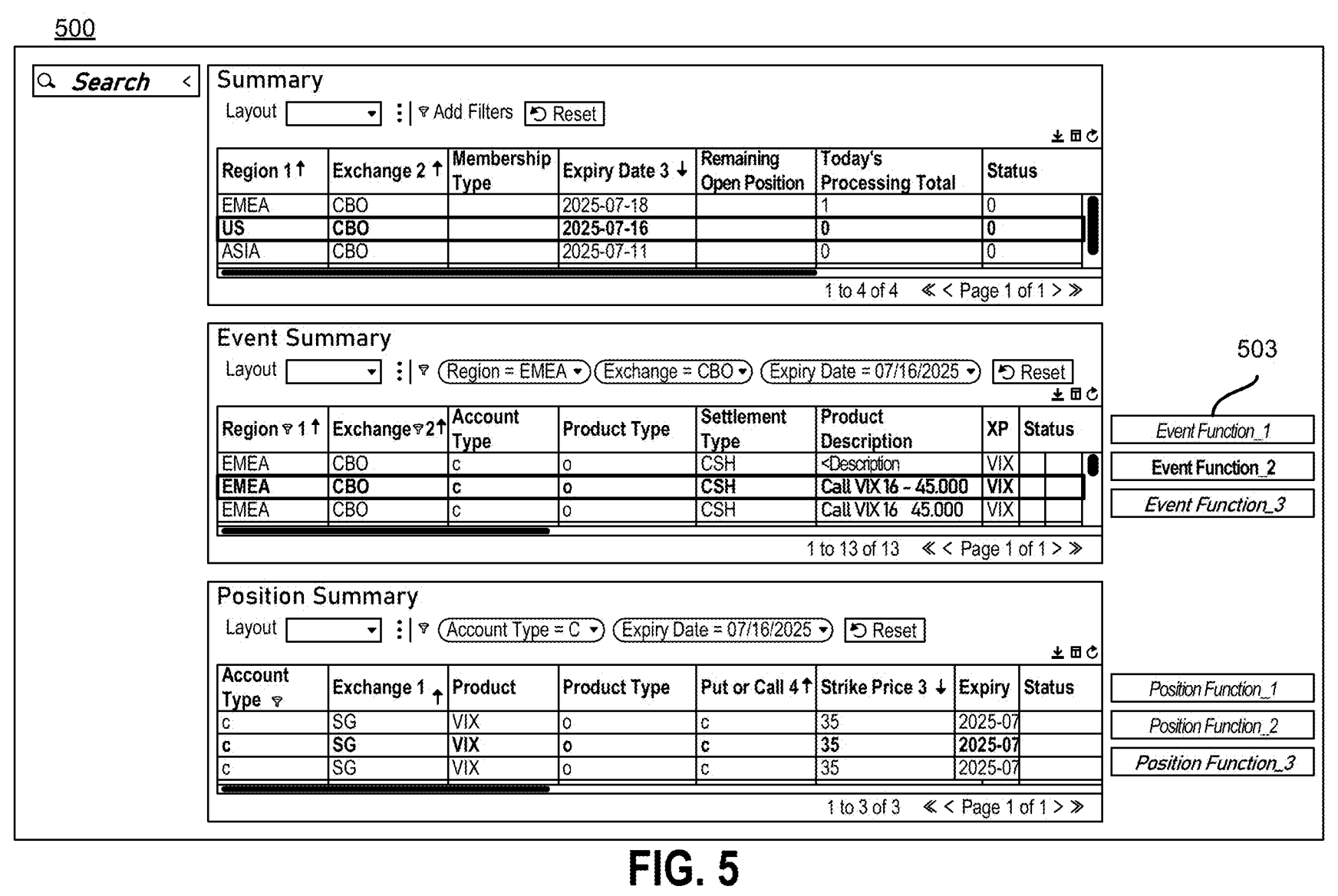

Search <

Summary

Layout | Add Filters | Reset

| Region 1 ↑ | Exchange 2 ↑ | Membership Type | Expiry Date 3 ↓ | Remaining Open Position | Today's Processing Total | Status |
|---|---|---|---|---|---|---|
| EMEA | CBO | | 2025-07-18 | | 1 | 0 |
| **US** | **CBO** | | **2025-07-16** | | **0** | **0** |
| ASIA | CBO | | 2025-07-11 | | 0 | 0 |

1 to 4 of 4 « < Page 1 of 1 > »

Event Summary

Layout | Region = EMEA | Exchange = CBO | Expiry Date = 07/16/2025 | Reset

| Region 1 ↑ | Exchange 2 ↑ | Account Type | Product Type | Settlement Type | Product Description | XP | Status |
|---|---|---|---|---|---|---|---|
| EMEA | CBO | c | o | CSH | <Description | VIX | |
| **EMEA** | **CBO** | **c** | **o** | **CSH** | **Call VIX 16 - 45.000** | **VIX** | |
| EMEA | CBO | c | o | CSH | Call VIX 16 45.000 | VIX | |

1 to 13 of 13 « < Page 1 of 1 > »

503

Event Function_1

Event Function_2

Event Function_3

Position Summary

Layout | Account Type = C | Expiry Date = 07/16/2025 | Reset

| Account Type | Exchange 1 ↑ | Product | Product Type | Put or Call 4 ↑ | Strike Price 3 ↓ | Expiry | Status |
|---|---|---|---|---|---|---|---|
| c | SG | VIX | o | c | 35 | 2025-07 | |
| **c** | **SG** | **VIX** | **o** | **c** | **35** | **2025-07** | |
| c | SG | VIX | o | c | 35 | 2025-07 | |

1 to 3 of 3 « < Page 1 of 1 > »

Position Function_1

Position Function_2

Position Function_3

FIG. 5

ENABLING OPERATION TRACKING USING GRAPHICAL USER INTERFACES

BACKGROUND

System operators within organizations rely heavily on graphical user interfaces to manage complex operational workflows across multiple disparate systems. Traditional approaches often result in fragmented systems where users must navigate between multiple specialized interfaces, each designed for a specific system or system type. Thus, users frequently encounter interfaces that either oversimplify complex operational data or present overwhelming amounts of information without adequate filtering and organization capabilities. The complexity increases when managing operations that require reconciliation between internal systems and external exchange data.

SUMMARY

In addition to the above issues, conventional systems struggle to dynamically adapt their functionality based on the type of operations being managed, often displaying irrelevant options or failing to surface appropriate actions for specific operational contexts. Current graphical interfaces often lack the sophistication to normalize data from multiple sources while preserving the contextual information necessary for informed decision-making across diverse operational scenarios. An interface update system may be used to solve the issues discussed herein.

The interface update system may enable operation tracking using graphical interfaces. In some implementations, the interface update system may receive operational files from multiple operation management systems, with each file containing user operations from those operation management systems. The interface update system may transform user operations within these files from their original encoding to a standard encoding format and generate a first graphical user interface with selectable areas, where one area displays indicators of the operational files and allows users to select each file. Based on a user's selection of a specific operational file, the interface update system may identify from which operation management system that file was received. The interface update system may then generate a second graphical interface that includes the original selectable area plus a new area displaying selectable operational indicators for operations within the selected file. When a user selects a specific operation indicator, the system may determine what functions are available to execute against that operation based on the corresponding operation management system. The system may then generate a third graphical interface that includes all previous areas plus a new area showing operational details for the selected operation, along with operation indicators that show which functions are selectable and which are not available for that specific operation.

According to an aspect of the present disclosure, an interface update system for enabling operation tracking using graphical interfaces is provided. The interface update system may handle data collection from multiple sources. The interface update system may receive from a plurality of operation management systems, a plurality of operational files, where each operational file of the plurality of operational files includes a corresponding plurality of user operations. For example, the system may receive operational files from different operation platforms, each containing transaction records, position data, or exercise requests in their native formats.

The interface update system may standardize data formats across different sources. In particular, the interface update system may transform a plurality of user operations within the plurality of operational files from a corresponding native encoding to a standard encoding. For example, the system may convert position data from one system's proprietary format and another system's different format into a unified data structure that can be processed consistently.

The interface update system may provide an initial navigation interface for file selection. In particular, the interface update system may generate a first graphical user interface including a plurality of selectable areas, where a first selectable area displays indicators of the plurality of operational files and enables a user selection of each operational file from the plurality of operational files received from the plurality of operation management systems. For example, the interface may display a list of files organized by operation management system, with each file represented by an indicator showing the source system and, in some implementations, a date range.

The interface update system may identify the source system for selected files. Based on receiving a first user selection of a first operational file of the plurality of operational files, the interface update system may identify a first operation management system of the plurality of operation management systems corresponding to the first operational file. For example, when a user selects on a file indicator, the system may determine whether the file originated from a US system or a Hong Kong system.

The interface update system may then provide detailed operation selection capabilities. In particular, the interface update system may generate a second graphical user interface including the first selectable area and a second selectable area, where the second selectable area displays a plurality of selectable operational indicators corresponding to a first plurality of operations within the first operational file. For example, the interface may show a hierarchical view with expiry dates at the top level and individual entries next to each date.

The interface update system may determine context-specific functionality based on operation characteristics. In particular, in response to receiving a second user selection, from the second selectable area, of a first selectable operation indicator associated with a first operation, the interface update system may determine, based on the first operation management system, a first subset of available functions that are executable against the first operation, where the first subset of available functions is within a set of functions. For example, if a user selects a particular entry from a US system, the system may determine that early exercise functions are available, but if they select a different entry, those functions would not be available.

The interface update system may provide comprehensive operation management with selective functionality. In particular, the interface update system may generate a third graphical user interface including the first selectable area, the second selectable area, a third selectable area, and a set of operation indicators, where the third selectable area includes operational details associated with the first operation, and where the set of operation indicators for the set of functions includes a first subset of selectable indicators corresponding to the first subset of available functions and a second subset of non-selectable indicators corresponding to a second subset of unavailable functions that are not available to be executed against the first operation and are executable against one or more other operations. For example, the interface may display detailed position information in one area while showing enabled buttons for available actions such "Submit Early Exercise" and grayed-out buttons for unavailable actions like "Assign Position."

According to other aspects of the present disclosure, the system may include one or more of the following features. For example, in response to the first user selection of the first operational file, the interface update system may generate for display, a third subset of selectable indicators corresponding to a third subset of available functions and a fourth subset of non-selectable indicators corresponding to a fourth set of unavailable functions that are not available to be executed against operational files from the first operation management system and are executable against other operational files from other operation management systems.

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), of a given item (e.g., data), unless the context clearly dictates otherwise.

BRIEF DESCRIPTION OF FIGURES

FIG. 3 illustrates a block diagram of an operation tracking data structure, according to aspects of the present disclosure.

FIG. 4 illustrates a block diagram of a selection data structure, according to an embodiment.

FIG. 5 depicts a graphical user interface display for managing operational data, according to aspects of the present disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
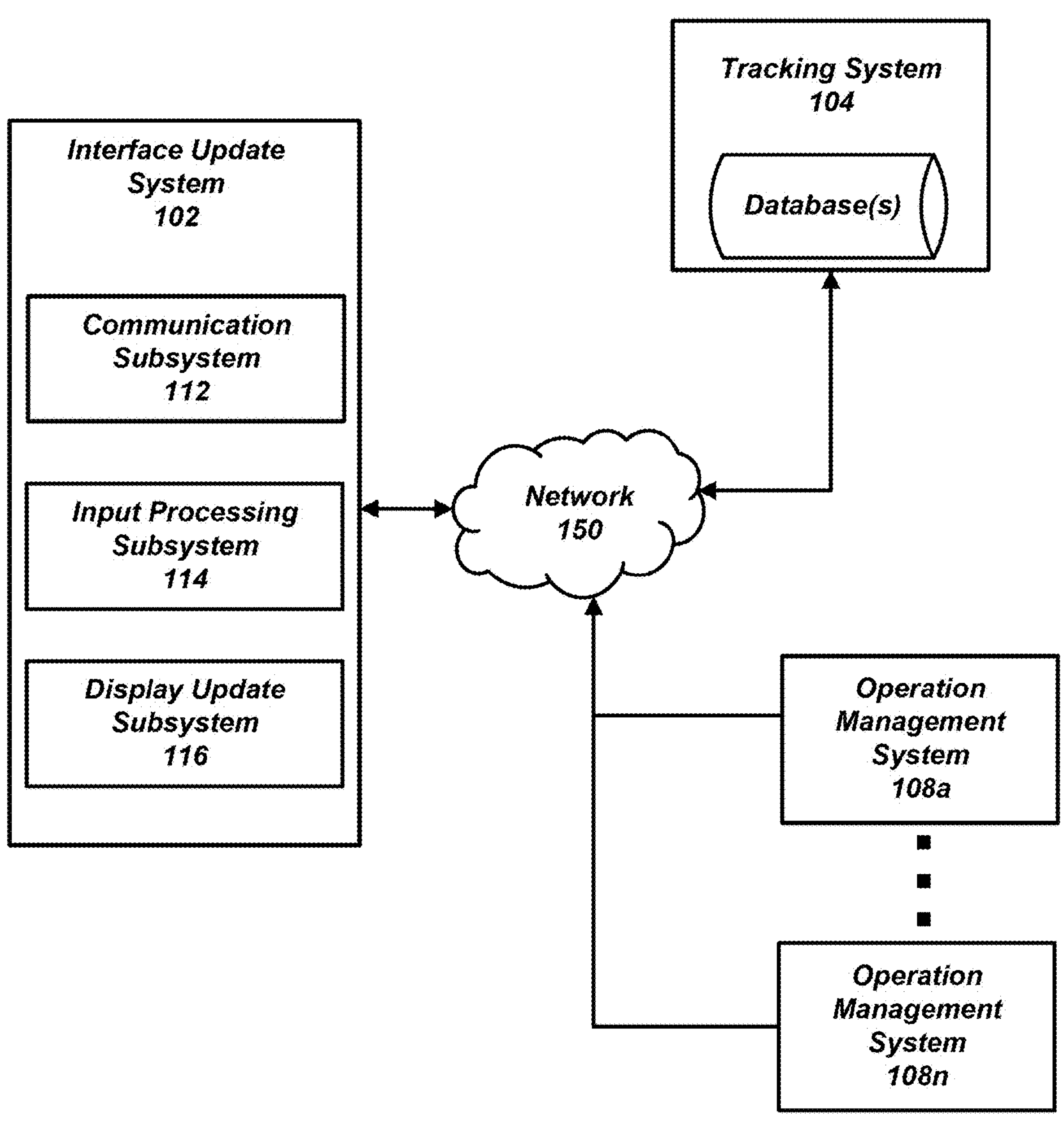
FIG. 1 illustrates a block diagram of an operation tracking system, according to aspects of the present disclosure.

FIG. 1 is an example of environment 100 for enabling operation tracking using graphical interfaces. Environment 100 includes interface update system 102, tracking system 104, and operation management systems**108*a*-108*n*. Interface update system 102 may execute instructions for enabling operation tracking using graphical interfaces. Interface update system 102 may include software, hardware, or a combination of the two. For example, interface update system 102 may be hosted on a physical server or a virtual server that is running on a physical computer system. In some implementations, interface update system 102** may be configured on a user device (e.g., a laptop computer, a smartphone, a desktop computer, an electronic tablet, or another suitable user device).

Interface update system 102 may enable operation tracking using graphical interfaces for managing operational data across multiple systems. Interface update system 102 may serve as a centralized platform that receives, processes, and presents operational information from various sources through dynamic user interfaces that adapt based on the specific operational context and data being managed.

As shown in FIG. 1, an operation tracking system 100 may include interface update system 102, tracking system 104, and multiple operation management systems including operation management system **108*a* and operation management system 108*n*. The operation management systems may represent different operational platforms or exchanges that generate and manage operational data in various native formats. Interface update system 102 may handle multiple operation management systems (e.g., multiple markets and exchanges) by normalizing data from various sources into standardized formats for consistent presentation and processing. A network 150 may interconnect interface update system 102, tracking system 104, and the operation management systems to enable data communication and coordination between the components. Network 150 may facilitate the transfer of operational files, user selections, and processing commands between the various systems within operation tracking system 100**.

Interface update system 102 may transform operational data from different native encodings used by the various operation management systems into a standard encoding format. Furthermore, interface update system 102 may generate graphical user interfaces that dynamically adjust available functions and display options based on the source operation management system and the specific operational data being processed. The dynamic nature of the interfaces may allow users to interact with different types of operational data through consistent interface elements while maintaining access to system-specific functions and capabilities.

Interface update system 102 may include a communication subsystem 112, an input processing subsystem 114, and a display update subsystem 116 that work together to manage data exchange, user interactions, and interface presentation functions. Communication subsystem 112 may handle data communication protocols and coordinate information transfer between interface update system 102 and other components within operation tracking system 100. Communication subsystem 112 may establish and maintain network connections, manage data transmission formats, and ensure reliable communication channels between interface update system 102 and the operation management systems through network 150.

Input processing subsystem 114 may receive and process user interactions from graphical user interfaces, including user selections, data entries, and operational commands. Input processing subsystem 114 may validate user inputs, translate user actions into system commands, and route processed input data to appropriate system components for further handling. In some cases, input processing subsystem 114 may implement cascade waterfall logic for navigation that adapts interface options based on user roles and operational contexts. The cascade waterfall logic may provide different levels of access and functionality depending on user permissions and the specific operational data being processed.

Display update subsystem 116 may manage the generation and updating of graphical user interfaces based on operational data and user interactions. Display update subsystem 116 may render interface elements, update display areas with current operational information, and modify available functions based on selected operational data and corresponding operation management systems. In some implementations, display update subsystem 116 may operate in real-time throughout operational periods, continuously processing data from different sources and normalizing information for consistent presentation across various operational contexts. The real-time processing capability may enable display update subsystem 116 to compare data from multiple sources and present updated interface elements that reflect current operational states and available functions.

Interface update system 102 may serve as a centralized data collection point that gathers operational information from various sources across different platforms. Interface update system 102 may receive from a plurality of operation management systems, a plurality of operational files, where each operational file of the plurality of operational files includes a corresponding plurality of user operations. For example, interface update system 102 may establish communication channels with operation management system 108*a* and operation management system 108*n* through network 150, where each operation management system may transmit operational files containing user operations such as exercise assignment requests, position data, and expiry processing information.

The operation management systems may generate operational files in different native encoding formats based on their specific system architectures and data structures. Interface update system 102 may transform a plurality of user operations within the plurality of operational files from a corresponding native encoding to a standard encoding. For example, operation management system 108*a* may transmit operational files encoded in a proprietary binary format specific to options trading platforms, while operation management system 108*n* may provide operational files in XML format with custom schema definitions for futures markets. Interface update system 102 may convert these disparate formats into a unified JSON-based standard encoding that normalizes field names, data types, and structural relationships across all operational files.

Communication subsystem 112 may handle the initial reception of operational files from the operation management systems and coordinate the data transformation processes. Communication subsystem 112 may parse incoming operational files to identify their native encoding formats and route the files to appropriate transformation modules within interface update system 102. The transformation process may involve mapping native field identifiers to standardized field names, converting data types from system-specific formats to common data types, and restructuring hierarchical data relationships to conform to the standard encoding schema. For example, a native encoding may represent monetary values as integer cents while the standard encoding may represent the same values as decimal currency units, requiring mathematical conversion during the transformation process.

Interface update system 102 may create a visual interface that allows users to view and interact with operational data from multiple sources. Interface update system 102 may generate a first graphical user interface including a plurality of selectable areas. A first selectable area may display indicators of the plurality of operational files and may enable a user selection of each operational file from the plurality of operational files received from the plurality of operation management systems. For example, interface update system 102 may create a visual display that presents operational files as selectable items organized by source system, expiration date, or operational type, allowing users to choose specific files for detailed review and processing.

Figure 2:
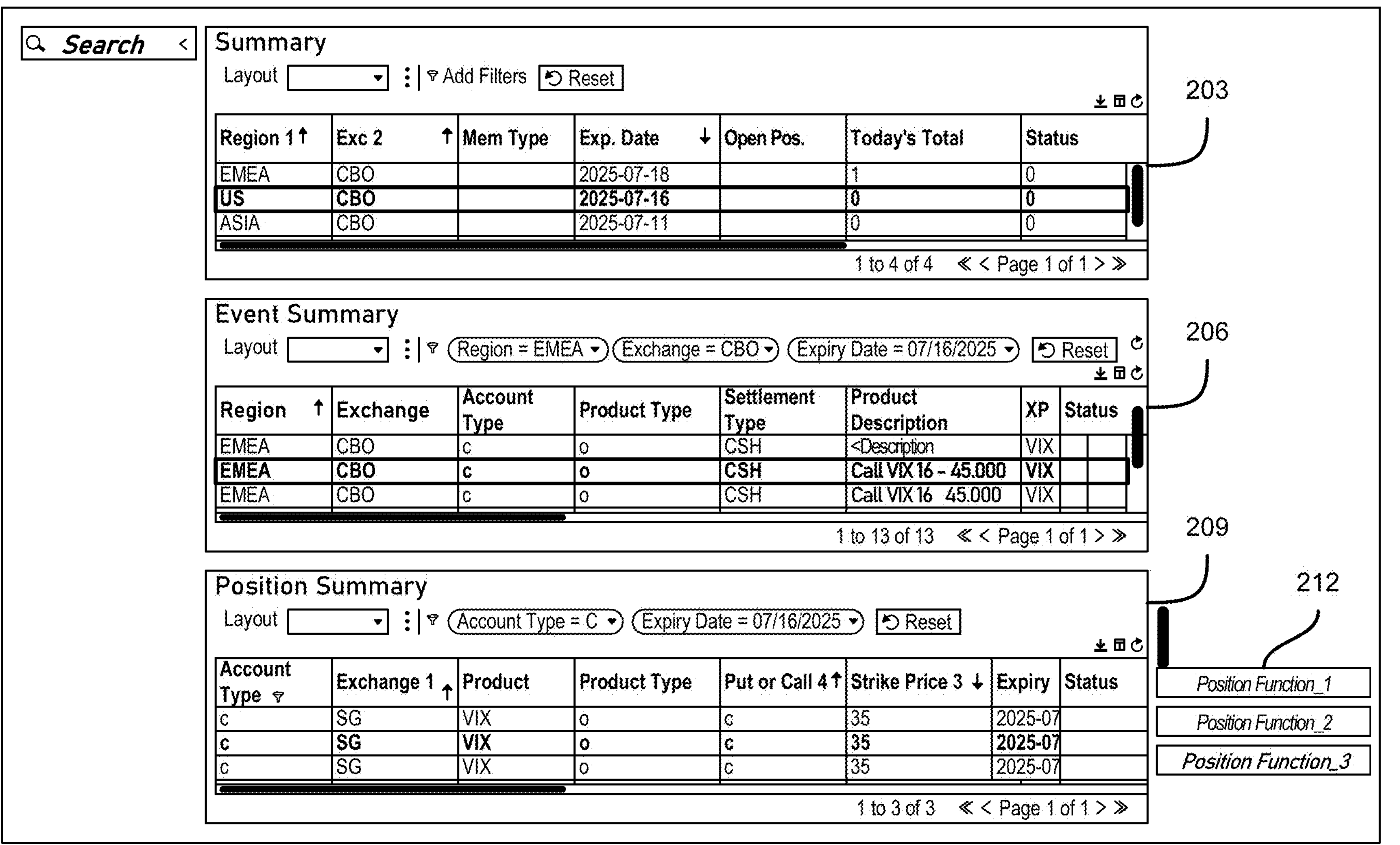
FIG. 2 depicts a graphical user interface for managing operational data and processing requests, according to an embodiment.

FIG. 2 shows a graphical user interface 200 that may represent an example implementation of the first graphical user interface generated by interface update system 102. Graphical user interface 200 may include multiple display sections that organize operational information in a hierarchical manner for user interaction. A first display area 203 may be positioned at the top portion of the graphical user interface 200 and may present summary-level indicators of operational files received from different operation management systems. First display area 203 may display operational files as selectable entries that users may choose to access detailed operational data and processing functions.

Interface update system 102 may organize operational file indicators within first display area 203 based on various criteria such as source operation management system, operational priority, or temporal proximity to processing deadlines. For example, interface update system 102 may group operational files from operation management system 108*a* under a first category indicator and operational files from operation management system 108*n* under a second category indicator, allowing users to distinguish between files from different operational sources. First display area 203 may present each operational file indicator with associated metadata such as file creation timestamp, source system identifier, and operational file type to assist users in making informed selections.

Display update subsystem 116 may render the operational file indicators within the first display area 203 using visual elements such as text labels, color coding, or graphical symbols that convey operational file characteristics and status information. For example, display update subsystem 116 may display operational files approaching expiration deadlines using highlighted indicators or different color schemes to draw user attention to time-sensitive operational data. The visual presentation may enable users to quickly identify and select relevant operational files from the plurality of operational files received from multiple operation management systems through network 150.

Interface update system 102 may include functionality for determining which operation management system generated a particular operational file when a user makes a selection. Based on receiving a first user selection of a first operational file of the plurality of operational files, interface update system 102 may identify a first operation management system of the plurality of operation management systems corresponding to the first operational file. For example, when a user selects an operational file containing options exercise data from first display area 203, interface update system 102 may analyze metadata embedded within the operational file to determine that the file originated from operation management system 108*a* rather than operation management system 108*n*.

Interface update system 102 may maintain mapping relationships between operational files and their source operation management systems to enable accurate system identification during user interactions. Interface update system 102 may store operational file metadata that includes system identifier fields, transmission timestamps, and source system authentication tokens that link each operational file to a specific operation management system. For example, interface update system 102 may assign unique system identifiers such as "USLO_001" for operation management system 108*a* handling US options markets and "HK_002" for operation management system 108*n* managing Hong Kong derivatives markets, allowing interface update system 102 to distinguish between operational files from different sources.

The identification process may involve multiple verification methods to ensure accurate mapping between operational files and operation management systems. Interface update system 102 may examine operational file headers that contain source system signatures, analyze data structure patterns that are characteristic of specific operation management systems, and validate transmission pathway information that indicates the network route through which the operational file was received. For example, interface update system 102 may recognize that operational files containing specific field arrangements for exercise assignment automation originated from operation management system 108*a*, while operational files with different schema structures for position reconciliation data came from operation management system 108*n*.

Communication subsystem 112 may facilitate the identification process by maintaining connection logs and transmission records that associate incoming operational files with their source operation management systems. Communication subsystem 112 may record network connection parameters, authentication credentials, and transmission protocols used by each operation management system when transmitting operational files to interface update system 102. The recorded information may enable interface update system 102 to cross-reference user-selected operational files with their corresponding source systems based on transmission history and connection metadata stored within tracking system 104.

Interface update system 102 may create an expanded visual interface that provides users with detailed operational information after selecting a specific operational file. Interface update system 102 may generate a second graphical user interface including the first selectable area and a second selectable area. The second selectable area may display a plurality of selectable operational indicators corresponding to a first plurality of operations within the first operational file. For example, when a user selects an operational file containing options exercise data from first display area 203, interface update system 102 may create an expanded interface that maintains the original file selection area while adding a new section that presents individual operations contained within the selected file as interactive elements.

A second display area 206 may be positioned below first display area 203 within the graphical user interface 200 and may present operational indicators for individual operations extracted from the user-selected operational file. Second display area 206 may organize operational indicators using various presentation formats such as tabular layouts, hierarchical trees, or categorized groupings that enable users to identify and select specific operations for further processing.

Display update subsystem 116 may render the operational indicators within second display area 206 using visual elements that convey operational characteristics such as operation type, processing status, and temporal information related to expiration dates or processing deadlines.

In some implementations, interface update system 102 may analyze the selected operational file to identify operations that require user attention or processing actions. Interface update system 102 may identify a plurality of operations from the first operational file that do not have a corresponding counter-operation. For example, interface update system 102 may examine position data within the selected operational file to locate long option positions that lack corresponding short positions, or exercise requests that have not been matched with assignment notifications from the operation management systems. The identification process may involve comparing operation records within the operational file against predefined matching criteria to determine which operations remain unmatched or require additional processing steps.

Interface update system 102 may organize the identified operations in a manner that assists users in prioritizing processing activities based on temporal constraints and operational deadlines. Interface update system 102 may generate for display a plurality of indicators for the plurality of operations. The plurality of operations may be sorted based on expiration date. Each indicator of the plurality of indicators may be associated with a corresponding data structure storing information related to a corresponding operation of the plurality of operations. For example, interface update system 102 may arrange operational indicators within second display area 206 in chronological order based on option expiration dates, with operations approaching expiration displayed prominently to draw user attention to time-sensitive processing requirements.

The data structures associated with each operational indicator may contain comprehensive information about the corresponding operations including position quantities, account identifiers, product specifications, and processing parameters. Interface update system 102 may store operational data structures within tracking system 104 and may link each operational indicator displayed in second display area 206 to the corresponding data structure through unique identifier relationships. For example, an operational indicator representing an options exercise request may be linked to a data structure containing client account numbers, option contract specifications, exercise quantities, and validation parameters needed for processing the exercise request through the appropriate operation management system.

Interface update system 102 may provide users with processing options that become available when specific operational indicators are selected from second display area 206. Interface update system 102 may generate for display an option to execute a selected operation prior to the expiration date. The option may become selectable when an indicator of the plurality of indicators is selected. For example, interface update system 102 may present an "Early Exercise" button or similar interface element that remains inactive until a user selects a specific operational indicator from second display area 206, at which point the processing option becomes active and available for user interaction to initiate exercise processing for the selected operation.

Interface update system 102 may include functionality for determining which functions are available for execution against specific operations based on the source operation management system and operational characteristics. Interface update system 102 may analyze operational data and system relationships to identify appropriate processing functions that may be applied to selected operations. Interface update system 102 may determine, based on the first operation management system, a first subset of available functions that are executable against the first operation. The first subset of available functions may be within a set of functions. For example, when a user selects an options exercise operation that originated from operation management system 108*a*, interface update system 102 may identify functions such as "early exercise processing" and "assignment notification" that are available for options operations from that particular operation management system, while excluding functions like "futures settlement" that are not applicable to options operations.

FIG. 3 shows an operation tracking data structure 300 that may represent how interface update system 102 organizes and manages function availability information for different operation management systems. Operation tracking data structure 300 may include a management system identifier 303, a function list 306, and a function data store 309 that work together to map operation management systems to their corresponding available functions and associated data elements. Management system identifier 303 may contain unique identifiers for each operation management system within the operation tracking system 100, such as numerical codes or alphanumeric strings that distinguish between different operational platforms and exchanges.

Function list 306 may contain collections of functions that are available for execution within each operation management system identified in management system identifier 303. Interface update system 102 may access function list 306 with function names and identifiers that correspond to operational capabilities supported by each operation management system. For example, the function list 306 may include entries such as "Function_1" representing early exercise processing, "Function_2" representing position reconciliation, and "Function_3" representing expiry processing, where each function corresponds to specific operational capabilities available within particular operation management systems.

Function data store 309 may contain parameter sets and configuration data associated with each function listed in the function list 306. Interface update system 102 may store within function data store 309 the operational parameters, validation rules, and execution requirements needed to properly invoke each function against operations from specific operation management systems. For example, the function data store 309 may contain "Data_1" representing exercise quantity limits and validation parameters for early exercise functions, "Data_2" representing account mapping rules for position reconciliation functions, and "Data_3" representing deadline constraints for expiry processing functions.

Interface update system 102 may implement function filtering logic that evaluates operational characteristics to determine which functions from function list 306 are applicable to specific operations. Interface update system 102 may identify, for the first operation management system, a plurality of available functions. Interface update system 102 may determine a type of a plurality of types associated with the first operation. Interface update system 102 may select one or more available functions of the plurality of available functions that are executable against the type associated with the first operation. For example, interface update system 102 may examine an operation to determine that the operation represents a long options position, then filter the available functions from operation management system 108*a* to select only those functions such as "early exercise" and "position transfer" that may be executed against long positions, while excluding functions such as "assignment processing" that apply only to short positions.

The function filtering process may involve multiple evaluation criteria that interface update system 102 applies to determine function compatibility with selected operations. Interface update system 102 may analyze operation metadata including position direction, product type, expiration status, and account classification to match operations with appropriate functions from the operation tracking data structure 300. For example, interface update system 102 may determine that an operation represents an American-style option that has not yet expired, then select functions from function list 306 that are compatible with non-expired American options while filtering out functions that apply only to European-style options or expired positions.

Communication subsystem 112 may facilitate the function determination process by retrieving function availability information from the tracking system 104 and coordinating with operation management systems to validate function compatibility. Communication subsystem 112 may query the operation tracking data structure 300 to obtain current function lists and associated parameters for specific operation management systems, ensuring that interface update system 102 has access to up-to-date function availability information when processing user selections and generating interface elements.

Interface update system 102 may create a comprehensive visual interface that provides users with complete operational information and processing capabilities after selecting specific operations from the second display area 206. Interface update system 102 may generate a third graphical user interface including the first selectable area, the second selectable area, a third selectable area, and a set of operation indicators. The third selectable area may include operational details associated with the first operation. The set of operation indicators for the set of functions may include a first subset of selectable indicators corresponding to the first subset of available functions and a second subset of non-selectable indicators corresponding to a second subset of unavailable functions that are not available to be executed against the first operation and are executable against one or more other operations. For example, when a user selects a specific options exercise operation from the second display area 206, interface update system 102 may expand the graphical user interface 200 to include detailed position information, account data, and processing controls while displaying function buttons that are either active or inactive based on the operation type and source system capabilities.

A third display area 209 may be positioned below the second display area 206 within the graphical user interface 200 and may present detailed operational information for the user-selected operation. The third display area 209 may display comprehensive data about the selected operation including position quantities, account identifiers, expiration dates, strike prices, and other operational parameters that users may need to review before executing processing functions. Display update subsystem 116 may render the operational details within the third display area 209 using structured layouts such as tabular formats or form-based presentations that organize operational data in a readable and accessible manner for user review and validation.

Interface update system 102 may present processing functions through visual controls that indicate function availability based on operational characteristics and system capabilities. Function buttons 212 may be arranged along the right side of the third display area 209 and may provide selectable operational controls for executing various processing functions against the selected operation. The function buttons 212 may include both active and inactive elements that correspond to the first subset of available functions and the second subset of unavailable functions determined by interface update system 102 based on the operation type and source operation management system.

Display update subsystem 116 may render the function buttons 212 using visual indicators that clearly distinguish between selectable and non-selectable function options. For example, display update subsystem 116 may display selectable function buttons using standard color schemes and interactive visual elements such as raised button appearances or hover effects, while non-selectable function buttons may be rendered using grayed-out colors, flattened appearances, or other visual cues that indicate the functions are not available for execution against the currently selected operation. The visual differentiation may enable users to quickly identify which processing functions may be applied to the selected operation without requiring additional system queries or error messages.

Interface update system 102 may implement dynamic function availability logic that updates the selectable and non-selectable states of the function buttons 212 based on operational context and system relationships. Interface update system 102 may analyze the selected operation against the operation tracking data structure 300 to determine which functions from the function list 306 are compatible with the operation type, source system, and current operational status. For example, interface update system 102 may determine that an early exercise function is available for a long options position that has not yet expired, causing the corresponding function button within the function buttons 212 to be rendered as selectable, while assignment processing functions may be rendered as non-selectable because assignment processing applies only to short positions rather than long positions.

Interface update system 102 may provide users with time-sensitive processing options that become available when specific operational conditions are met. Interface update system 102 may generate for display an option to execute a selected operation prior to the expiration date. The option may become selectable when an indicator of the plurality of indicators is selected. For example, interface update system 102 may present an "Early Exercise" function button within the function buttons 212 that remains inactive until a user selects a specific operational indicator from the second display area 206 representing a long options position, at which point the early exercise option becomes active and available for user interaction to initiate exercise processing through the appropriate operation management system.

Interface update system 102 may implement responsive interface behavior that updates processing options based on user selections and operational data relationships. Interface update system 102 may receive a selection of a first indicator of the plurality of indicators. In response to receiving the selection of the first indicator of the plurality of indicators, interface update system 102 may update the option to become selectable and may associate a first data structure corresponding to the first indicator with the option. For example, when a user selects an operational indicator representing a specific options exercise request from the second display area 206, interface update system 102 may activate the corresponding processing function within the function buttons 212 and may link the operational data structure containing exercise parameters, account information, and validation requirements to the activated function button for subsequent processing operations.

The data structure association process may enable interface update system 102 to maintain operational context and parameter information when users interact with processing functions through the function buttons 212. Interface update system 102 may store within tracking system 104 the relationships between selected operational indicators, their corresponding data structures, and the activated processing functions to ensure that subsequent processing operations have access to the appropriate operational parameters and validation data. For example, interface update system 102 may associate an exercise request data structure containing client account numbers, option contract specifications, and exercise quantities with an activated early exercise function button, enabling the processing function to access the operational parameters when the user initiates the exercise processing workflow.

Interface update system 102 may implement file-level function management that determines processing capabilities based on the source operation management system for entire operational files. Interface update system 102 may analyze operational files to identify their originating operation management systems and may determine which functions are available for execution against files from specific systems. The file-level function determination process may involve evaluating system-specific capabilities and operational constraints that apply to all operations within a particular operational file rather than individual operations.

Interface update system 102 may generate visual indicators that distinguish between functions available for the currently selected operational file and functions that are executable against operational files from other operation management systems. Interface update system 102 may create a third subset of selectable indicators corresponding to a third subset of available functions that may be executed against the selected operational file. Interface update system 102 may also generate a fourth subset of non-selectable indicators corresponding to a fourth set of unavailable functions that are not available to be executed against operational files from the first operation management system. These unavailable functions may be executable against other operational files from other operation management systems.

The file-level function availability determination may involve analyzing system-specific processing capabilities and operational constraints that apply at the file level rather than the individual operation level. Interface update system 102 may examine the first operation management system characteristics to identify functions such as "bulk processing," "file validation," or "batch reconciliation" that may be available for operational files from that system. Interface update system 102 may simultaneously identify functions such as "cross-system netting," "multi-currency settlement," or "regulatory reporting" that may be available for operational files from other operation management systems but not applicable to files from the first operation management system.

Display update subsystem 116 may render the file-level function indicators using visual elements that clearly distinguish between functions available for the current operational file and functions that are applicable to files from other systems. Display update subsystem 116 may present the third subset of selectable indicators using active visual states such as enabled button appearances, standard color schemes, or interactive hover effects that indicate the functions may be executed against the currently selected operational file.

Display update subsystem 116 may render the fourth subset of non-selectable indicators using inactive visual states such as grayed-out appearances, disabled button states, or tooltip messages that explain the functions are not available for the current file but may be used with files from other operation management systems.

Interface update system 102 may implement dynamic file-level function filtering that updates available processing options when users switch between operational files from different operation management systems. Interface update system 102 may monitor user selections of operational files and may update the third subset of selectable indicators and fourth subset of non-selectable indicators based on the newly selected file's source system. For example, when a user switches from an operational file originating from operation management system 108*a* to an operational file from operation management system 108*n*, interface update system 102 may update the function availability indicators to reflect the different processing capabilities available for files from the new source system.

FIG. 5 shows interface display 500 which includes event function area 503 positioned along the right side of the interface. Event function area 503 may represent a visual implementation of the file-level function management capabilities described for interface update system 102. The event function area 503 may contain function buttons or controls that correspond to both the third subset of selectable indicators and the fourth subset of non-selectable indicators that interface update system 102 generates based on the source operation management system of the currently selected operational file.

Event function area 503 may display the third subset of selectable indicators as active function controls that users may interact with to execute processing functions against the selected operational file. These selectable indicators within event function area 503 may be rendered using visual elements that indicate their availability, such as standard button appearances, enabled states, or interactive visual feedback when users hover over or select the controls. The third subset of selectable indicators in event function area 503 may represent functions such as bulk processing, file validation, or batch reconciliation that are compatible with operational files from the currently selected operation management system.

Event function area 503 may simultaneously display the fourth subset of non-selectable indicators as inactive function controls that represent processing capabilities not available for the current operational file but executable against files from other operation management systems. Display update subsystem 116 may render these non-selectable indicators within event function area 503 using visual states that clearly distinguish them from the selectable indicators, such as grayed-out appearances, disabled button states, or reduced opacity that indicates the functions are not currently available for execution.

The event function area 503 may provide users with comprehensive visibility into both available and unavailable processing functions for the selected operational file, enabling users to understand the complete range of processing capabilities while clearly identifying which functions may be executed against their current operational context. Interface update system 102 may update the visual states of indicators within event function area 503 when users switch between operational files from different operation management systems, dynamically adjusting the third and fourth subsets of indicators to reflect the processing capabilities available for the newly selected file's source system.

Communication subsystem 112 may coordinate with tracking system 104 to retrieve file-level function availability information for different operation management systems. Communication subsystem 112 may query operation tracking data structure 300 to obtain function lists that specify which processing capabilities are available at the file level for each operation management system. Communication subsystem 112 may maintain mapping relationships between operation management systems and their corresponding file-level processing functions to enable accurate function availability determination when users interact with operational files from different sources.

Interface update system 102 may provide contextual information about unavailable functions to help users understand why certain processing options are not available for the currently selected operational file. Interface update system 102 may generate tooltip displays or informational messages that explain which operation management systems support the unavailable functions and under what circumstances those functions become available. For example, interface update system 102 may display a message indicating that "Multi-system reconciliation is available for files from Hong Kong operation management systems" when a user hovers over a non-selectable function indicator while viewing a file from a US operation management system.

The file-level function management process may enable interface update system 102 to provide users with comprehensive visibility into processing capabilities across different operation management systems while maintaining clear distinctions between functions that are available for immediate use and functions that require different operational contexts. Interface update system 102 may update the visual presentation of function availability indicators in response to user navigation between operational files from different sources, ensuring that users have accurate information about processing options available for their current operational context.

Interface update system 102 may implement command generation functionality that creates executable instructions when users interact with time-sensitive processing options. Interface update system 102 may receive a new user selection of the option to execute a selected operation prior to the expiration date. In response to receiving the new user selection of the option, interface update system 102 may generate a command to execute a function associated with the option. The command may include the first data structure that was previously associated with the option during the selection process. For example, when a user activates an early exercise function button from the function buttons 212, interface update system 102 may construct a command structure that incorporates the operational data structure containing exercise parameters, account identifiers, and validation requirements linked to the selected operational indicator. The information may be delivered to an operator who may then execute the operation.

In some implementations, interface update system 102 may implement command transmission capabilities that deliver executable instructions to appropriate operation management systems for processing. Interface update system 102 may transmit the command for execution over network 150. The transmission process may involve routing the command to the specific operation management system that corresponds to the selected operational file and operation. For example, interface update system 102 may direct an early exercise command containing options contract specifications and client account information to operation management system 108*a* when the selected operation originated from that particular system, ensuring that the command reaches the appropriate processing platform for execution.

Communication subsystem 112 may handle the command transmission process by establishing secure communication channels with the target operation management systems. Communication subsystem 112 may format the command structure according to the communication protocols and data requirements of the receiving operation management system. Communication subsystem 112 may validate command parameters before transmission to ensure that the command contains all necessary data elements for successful processing within the target system. The validation process may involve checking data completeness, format compliance, and parameter ranges to prevent transmission errors or processing failures.

Interface update system 102 may implement command tracking functionality that monitors the status of transmitted commands and provides feedback to users about processing progress. Interface update system 102 may maintain command execution logs within tracking system 104 that record command transmission timestamps, target systems, and processing status updates. Interface update system 102 may receive status notifications from operation management systems through network 150 and may update the command tracking records to reflect current processing states. For example, interface update system 102 may receive confirmation that an early exercise command has been successfully processed by operation management system 108*a* and may update the corresponding operational indicator within second display area 206 to reflect the completed processing status.

Display update subsystem 116 may provide visual feedback about command execution status through interface elements that inform users about processing progress and completion. Display update subsystem 116 may update the appearance of function buttons 212 to indicate when commands have been transmitted and are pending processing. Display update subsystem 116 may modify operational indicators within second display area 206 to show processing status changes such as "submitted," "processing," or "completed" based on status updates received from operation management systems. The visual feedback may enable users to track the progress of their processing requests without requiring additional system queries or manual status checks.

Interface update system 102 may implement error handling capabilities that manage command transmission failures and processing errors. Interface update system 102 may detect communication failures during command transmission and may implement retry mechanisms that attempt to retransmit commands to operation management systems. Interface update system 102 may receive error notifications from operation management systems when commands cannot be processed due to validation failures or system constraints. Interface update system 102 may present error information to users through display elements that explain the nature of processing failures and may provide guidance for resolving command execution issues.

Input processing subsystem 114 may validate user selections and operational parameters before generating commands for transmission. Input processing subsystem 114 may verify that selected operations meet the requirements for early execution processing, such as confirming that options positions have not yet expired and that account permissions allow for early exercise requests. Input processing subsystem 114 may check operational data structures for completeness and accuracy to ensure that generated commands contain valid parameters for processing within the target operation management systems. The validation process may prevent the generation of invalid commands that would result in processing errors or system failures.

Interface update system 102 may implement audit trail functionality that maintains comprehensive records of command generation and transmission activities. Interface update system 102 may store within tracking system 104 detailed logs that include user selections, generated commands, transmission timestamps, and processing outcomes for compliance and operational review purposes. Interface update system 102 may associate audit records with specific user sessions and operational contexts to enable traceability of processing activities across different operational files and operation management systems. The audit trail may provide operational oversight capabilities that support regulatory compliance and internal control requirements for operational processing activities.

Interface update system 102 may implement selection response functionality that activates processing options when users interact with specific operational indicators. Interface update system 102 may receive a selection of a first indicator from the plurality of indicators displayed within second display area 206. The selection may represent a user interaction with a specific operational indicator that corresponds to a particular operation within the selected operational file. Interface update system 102 may detect the selection through input processing subsystem 114, which may capture user interaction events and may identify the specific indicator that was selected from the available operational indicators.

Interface update system 102 may update the option to become selectable in response to receiving the selection of the first indicator. The option may represent a processing function such as early exercise execution that becomes available when specific operational conditions are met. Interface update system 102 may modify the visual state of the option from an inactive or disabled state to an active and selectable state, enabling users to interact with the processing function. Display update subsystem 116 may render the updated option using visual elements that indicate the function is now available for execution, such as changing button colors, enabling hover effects, or modifying button text to reflect the active state.

Interface update system 102 may associate a first data structure corresponding to the first indicator with the option during the selection response process. The first data structure may contain operational parameters, account information, and processing requirements that are specific to the operation represented by the selected indicator. Interface update system 102 may retrieve the first data structure from tracking system 104 based on the identifier associated with the selected indicator. The data structure may include elements such as position quantities, contract specifications, expiration dates, and validation parameters that are needed for processing the selected operation.

Interface update system 102 may establish a linkage between the activated option and the first data structure to ensure that subsequent processing operations have access to the appropriate operational parameters. Interface update system 102 may store the association within temporary memory structures or session variables that maintain the relationship between the selected option and its corresponding data elements. The association may enable interface update system 102 to access the operational parameters when users subsequently interact with the activated option to initiate processing functions.

Interface update system 102 may implement data structure validation during the association process to ensure that the first data structure contains complete and accurate information for the selected operation. Interface update system 102 may verify that required data fields are populated, that parameter values fall within acceptable ranges, and that the data structure format is compatible with the processing requirements of the activated option. Input processing subsystem 114 may perform validation checks on the data structure elements and may identify any missing or invalid data that could prevent successful processing execution.

Interface update system 102 may update interface elements to reflect the association between the option and the first data structure. Display update subsystem 116 may modify the appearance of the option to indicate that operational data has been successfully associated with the processing function. Interface update system 102 may display contextual information about the associated operation, such as showing operation details or parameter summaries near the activated option to provide users with confirmation that the correct operational data has been linked to the processing function.

Interface update system 102 may implement dynamic option management that handles multiple indicator selections and their corresponding data structure associations. Interface update system 102 may maintain separate associations for different selected indicators, enabling users to activate multiple processing options simultaneously while preserving the correct data relationships for each option. Interface update system 102 may track the associations between indicators, options, and data structures to ensure that processing commands are generated with the appropriate operational parameters when users interact with the activated options.

Communication subsystem 112 may coordinate the data retrieval and association processes by interfacing with tracking system 104 to obtain the first data structure and by managing the data relationships within interface update system 102. Communication subsystem 112 may query tracking system 104 using the identifier from the selected indicator to retrieve the corresponding operational data structure. Communication subsystem 112 may validate the retrieved data structure and may provide the data to other subsystems within interface update system 102 for association with the activated option.

Interface update system 102 may implement session management functionality that preserves option states and data structure associations across user interactions. Interface update system 102 may maintain the association between the option and the first data structure until users complete their processing activities or navigate to different operational contexts. Interface update system 102 may store association information in session variables or temporary data structures that persist during user interactions with the graphical user interface while ensuring that data relationships are properly maintained throughout the operational workflow.

Interface update system 102 may implement function execution capabilities that process user-initiated commands when users interact with activated processing options. Interface update system 102 may receive a new user selection of the option to execute a selected operation prior to the expiration date. The new user selection may represent a user interaction with an activated processing function that has been associated with operational data from a selected indicator. Interface update system 102 may detect the user selection through input processing subsystem 114, which may capture the interaction event and may identify the specific option that was selected for execution.

Interface update system 102 may generate a command to execute a function associated with the option in response to receiving the new user selection. The command generation process may involve retrieving the operational parameters and processing requirements that were previously associated with the selected option during the indicator selection process. Interface update system 102 may access the first data structure that was linked to the option and may extract the operational data elements needed for command construction. The first data structure may contain position quantities, contract specifications, account identifiers, and validation parameters that define the processing requirements for the selected operation.

Interface update system 102 may construct the command structure to include the first data structure as part of the executable instruction set. The command may incorporate operational parameters from the first data structure to ensure that the processing function receives the appropriate data elements for execution. Interface update system 102 may format the command according to the requirements of the target operation management system and may include authentication tokens, processing timestamps, and validation checksums that enable secure command transmission and execution.

Interface update system 102 may implement command validation procedures that verify the completeness and accuracy of the generated command before transmission. Interface update system 102 may examine the command structure to ensure that all required data elements from the first data structure have been properly incorporated into the command. Interface update system 102 may validate parameter values against acceptable ranges and may verify that the command format conforms to the communication protocols expected by the target operation management system.

Interface update system 102 may transmit the command for execution over network 150 to the appropriate operation management system. The transmission process may involve establishing secure communication channels with the target system and may include authentication procedures that verify the authority to execute the requested function. Interface update system 102 may route the command to the specific operation management system that corresponds to the selected operational file and operation, ensuring that the command reaches the appropriate processing platform for execution.

Communication subsystem 112 may handle the command transmission process by managing network protocols and data formatting requirements. Communication subsystem 112 may establish connection parameters with the target operation management system and may implement encryption procedures that protect command data during transmission. Communication subsystem 112 may monitor transmission status and may provide confirmation when the command has been successfully delivered to the target system for processing.

Interface update system 102 may implement command acknowledgment functionality that receives confirmation of successful command transmission and processing initiation. Interface update system 102 may receive acknowledgment messages from operation management systems through network 150 that indicate the command has been received and queued for processing. Interface update system 102 may update command tracking records within tracking system 104 to reflect the transmission status and may prepare for subsequent status updates as the command progresses through the processing workflow.

Interface update system 102 may provide user feedback about command execution status through interface elements that display processing progress information. Display update subsystem 116 may update the appearance of the selected option to indicate that the command has been transmitted and is pending processing. Display update subsystem 116 may modify operational indicators within second display area 206 to show that processing has been initiated for the selected operation, providing users with visual confirmation that their processing request has been successfully submitted.

Interface update system 102 may implement result processing capabilities that handle execution outcomes and status updates from operation management systems. Interface update system 102 may receive processing results through network 150 and may update operational records within tracking system 104 to reflect the completion status of executed functions. Interface update system 102 may associate processing outcomes with the original operational indicators and may update interface displays to show the final status of executed operations, enabling users to verify that their processing requests have been completed successfully.

FIG. 4 shows a selection data structure 400 that may represent how interface update system 102 organizes and manages function selection information for different operation types. Selection data structure 400 may include a selected entry identifier 403, an option identifier 406, and entry data 409 that work together to map selected operational indicators to their corresponding processing options and associated parameter data. Selected entry identifier 403 may contain unique identifiers for each operational indicator that users may select from the second display area 206, such as numerical codes or alphanumeric strings that distinguish between different operations within the selected operational file.

Option identifier 406 may contain collections of processing options that become available when specific operational indicators are selected from the second display area 206. Interface update system 102 may access option identifier 406 with option names and identifiers that correspond to processing functions supported for each type of operation. For example, option identifier 406 may include entries such as "Option_1" representing early exercise processing, "Option_2" representing position transfer functions, and "Option_3" representing assignment processing, where each option corresponds to specific processing capabilities available for particular operation types.

Entry data 409 may contain parameter sets and configuration data associated with each option listed in option identifier 406. Interface update system 102 may store within entry data 409 the operational parameters, validation rules, and execution requirements needed to properly invoke each processing option against operations of specific types. For example, entry data 409 may contain "Param_Values_1" representing exercise quantity limits and validation parameters for early exercise options, "Param_Values_2" representing account mapping rules for position transfer options, and "Param_Values_3" representing deadline constraints for assignment processing options.

Interface update system 102 may implement type-based function filtering logic that evaluates operational characteristics to determine which functions from the available function set are applicable to specific operation types. Interface update system 102 may analyze the selected operation to identify its type classification based on characteristics such as position direction, contract specifications, expiration status, and underlying asset properties. The type determination process may involve examining operational metadata stored within the first data structure to classify the operation according to predefined type categories such as long positions, short positions, American-style options, European-style options, or expired contracts.

Interface update system 102 may maintain type compatibility mappings that associate specific function types with compatible operation types. Interface update system 102 may store within tracking system 104 the relationships between operation types and their corresponding available functions to enable accurate function filtering during user interactions. For example, interface update system 102 may maintain mappings that indicate early exercise functions are compatible with long American-style option positions that have not yet expired, while assignment processing functions are compatible with short option positions regardless of expiration status.

Interface update system 102 may apply the type compatibility mappings to filter the available functions from the first operation management system. Interface update system 102 may compare the determined operation type against the compatibility mappings to identify which functions from the available function set may be executed against the selected operation. The filtering process may involve evaluating multiple type characteristics simultaneously to ensure that selected functions are appropriate for the specific combination of operational attributes present in the selected operation.

Interface update system 102 may select one or more available functions from the plurality of available functions that are executable against the type associated with the first operation. The selection process may involve applying logical filtering rules that match operation type characteristics with function compatibility requirements. Interface update system 102 may identify functions that meet all compatibility criteria for the determined operation type and may exclude functions that are incompatible with any aspect of the operation's type classification.

Interface update system 102 may implement hierarchical type classification that enables more granular function selection based on multiple operation characteristics. Interface update system 102 may classify operations using multiple type dimensions such as primary type, secondary type, and tertiary type classifications that reflect different aspects of the operational data. For example, interface update system 102 may classify an operation with a primary type of "option," a secondary type of "American-style," and a tertiary type of "long position" to enable precise function filtering based on the complete type profile.

Interface update system 102 may apply cascading filter logic that progressively narrows the available function set based on each type dimension. Interface update system 102 may start with the complete set of functions available for the first operation management system and may apply successive filters based on primary type, secondary type, and tertiary type classifications. The cascading approach may ensure that only functions compatible with all aspects of the operation's type profile are included in the final selection of available functions.

Interface update system 102 may implement dynamic type determination that analyzes operational data in real-time to classify operations based on current characteristics. Interface update system 102 may examine operational parameters such as expiration dates, position quantities, and contract specifications to determine the current type classification for each operation. The dynamic approach may account for changes in operation characteristics that occur over time, such as approaching expiration dates or position modifications that may affect function compatibility.

Interface update system 102 may validate type-based function selections to ensure that selected functions remain compatible with the operation's current characteristics. Interface update system 102 may perform compatibility checks before enabling function options and may verify that operational parameters meet the requirements for each selected function. The validation process may prevent users from accessing functions that are no longer appropriate for the operation's current state or type classification.

Communication subsystem 112 may facilitate the type determination and function selection processes by retrieving type classification rules and compatibility mappings from tracking system 104. Communication subsystem 112 may query the selection data structure 400 to obtain current type definitions and function compatibility information for specific operation management systems. Communication subsystem 112 may ensure that interface update system 102 has access to up-to-date type classification criteria when processing user selections and determining function availability.

Display update subsystem 116 may render function availability indicators based on the type-based function selection results. Display update subsystem 116 may present selected functions as active interface elements while displaying incompatible functions as inactive or disabled elements within the function buttons 212. The visual presentation may provide users with clear indication of which processing functions are available for the selected operation based on its type classification and compatibility with the first operation management system.

Interface update system 102 may implement type-specific parameter validation that ensures selected functions receive appropriate operational data for execution. Interface update system 102 may validate that the first data structure contains parameter values that are compatible with the selected functions and the determined operation type. The validation process may verify that parameter formats, value ranges, and data relationships meet the requirements for successful function execution against operations of the determined type.

Interface update system 102 may provide type-based function recommendations that suggest appropriate processing options based on operation characteristics and user context. Interface update system 102 may analyze the determined operation type and may identify commonly used functions for similar operations to provide users with guidance about available processing options. The recommendation system may help users identify relevant functions for their operational workflows while maintaining compatibility with the operation's type classification and system capabilities.

Interface update system 102 may coordinate multiple subsystems to achieve dynamic interface functionality through integrated data processing and user interaction management. Communication subsystem 112 may establish data exchange pathways with operation management systems and may coordinate information transfer protocols that enable interface update system 102 to receive operational files from multiple sources simultaneously. Input processing subsystem 114 may process user selections and may translate user interactions into system commands that trigger specific processing workflows based on the selected operational data and corresponding operation management system characteristics. Display update subsystem 116 may render interface elements dynamically and may update visual components based on operational context changes that occur when users navigate between different operational files or select specific operations for processing.

The subsystems may work together to enable context-sensitive operation tracking through coordinated data analysis and interface adaptation processes. Communication subsystem 112 may retrieve operational data from tracking system 104 and may validate data relationships between selected operations and their source operation management systems to ensure accurate function availability determination. Input processing subsystem 114 may analyze user selections against stored operational parameters and may determine which processing functions are compatible with the selected operational data based on operation type, system capabilities, and current operational status. Display update subsystem 116 may modify interface elements (in some implementations in real-time) and may adjust the selectable and non-selectable states of function controls based on the compatibility analysis performed by input processing subsystem 114.

Interface update system 102 may generate and transmit commands to execute functions associated with selected processing options through coordinated subsystem interactions. Communication subsystem 112 may construct command structures that include operational parameters, validation data, and execution instructions derived from the selected operational data and associated data structures stored within tracking system 104. Input processing subsystem 114 may validate command parameters against operational constraints and may ensure that command structures contain the appropriate data elements needed for successful function execution within the target operation management system. Communication subsystem 112 may transmit the validated commands through network 150 to the appropriate operation management systems and may monitor command execution status to provide feedback to display update subsystem 116 for interface updates.

Interface update system 102 may implement dynamic interface reset functionality that manages user interface states when users switch between operational files from different operation management systems. Display update subsystem 116 may reset selectable areas and may set functions as unselectable when users select operational files that originate from different operation management systems than previously selected files. Input processing subsystem 114 may clear previous operational context data and may reinitialize interface state variables to ensure that function availability determinations are based on the newly selected operational file rather than previously selected operational data. Communication subsystem 112 may retrieve updated function availability information from tracking system 104 based on the newly identified operation management system and may provide the updated information to display update subsystem 116 for interface rendering.

The reset process may involve coordinated data structure updates that ensure interface consistency across different operational contexts. Display update subsystem 116 may clear previous operational indicators from display areas and may populate interface elements with operational data extracted from the newly selected operational file. Input processing subsystem 114 may reinitialize function filtering logic and may apply compatibility analysis to the new operational data to determine which functions should be rendered as selectable or non-selectable within the updated interface. Communication subsystem 112 may establish new data relationships between the selected operational file and its corresponding operation management system to enable accurate function availability determination for subsequent user interactions.

Interface update system 102 may perform top day positional validations across different book structures through coordinated data analysis and comparison processes. Communication subsystem 112 may retrieve positional data from multiple book structures within tracking system 104 and may normalize the positional data into comparable formats that enable cross-structure validation analysis. Input processing subsystem 114 may apply validation logic that compares positional data across different book structures and may identify discrepancies or inconsistencies that require operational attention or correction. Display update subsystem 116 may present validation results through interface elements that highlight positional differences and may provide users with tools for reviewing and addressing identified discrepancies.

The positional validation process may involve complex data relationship analysis that accounts for different book structure configurations and netting arrangements. Communication subsystem 112 may handle many-to-one relationships in position comparisons by aggregating positional data from multiple accounts or book structures and may compare the aggregated data against consolidated position records to identify matching or non-matching relationships. Input processing subsystem 114 may process the relationship analysis results and may determine which positional differences represent legitimate operational variations versus actual discrepancies that require correction. Display update subsystem 116 may organize validation results within interface displays and may present positional comparison data in formats that enable users to understand the relationships between different book structures and their corresponding positional data.

Interface update system 102 may perform P+1 position reconciliation at a gross position level through systematic data comparison and analysis processes. Communication subsystem 112 may retrieve position data from operation management systems and may obtain corresponding position records from tracking system 104 to enable comparative analysis between internal position holdings and external position data. Input processing subsystem 114 may execute reconciliation logic that compares gross position quantities across different data sources and may identify position differences that indicate potential reconciliation issues or data synchronization problems. Display update subsystem 116 may present reconciliation results through interface elements that display position comparisons and may highlight discrepancies that require user review or corrective action.

The reconciliation process may involve detailed data analysis that compares internal position holdings against exchange data to identify discrepancies between different data sources. Communication subsystem 112 may establish data connections with external exchanges and may retrieve position data that represents the authoritative position records maintained by the exchanges. Input processing subsystem 114 may compare the exchange position data against internal position records stored within tracking system 104 and may calculate position differences that indicate potential data synchronization issues or operational discrepancies. Display update subsystem 116 may render comparison results within interface displays and may provide users with detailed position difference information that enables identification and resolution of reconciliation discrepancies.

Interface update system 102 may add commentary and validations to operational processes through integrated data annotation and validation management capabilities. Input processing subsystem 114 may capture user-entered commentary data and may associate the commentary with specific operational records or processing workflows to provide operational context and documentation. Communication subsystem 112 may store commentary data within tracking system 104 and may maintain relationships between commentary records and their corresponding operational data to enable retrieval and display of commentary information during subsequent operational reviews. Display update subsystem 116 may present commentary data within interface elements and may provide users with tools for adding, editing, or reviewing commentary associated with operational processes.

The validation management process may involve systematic checks and verification procedures that ensure operational data meets specified criteria before processing execution. Input processing subsystem 114 may apply validation rules to operational data and may verify that operational parameters fall within acceptable ranges or meet specified requirements before enabling processing functions. Communication subsystem 112 may retrieve validation criteria from tracking system 104 and may provide validation rule information to input processing subsystem 114 for application during operational data analysis. Display update subsystem 116 may present validation results within interface elements and may indicate whether operational data passes or fails validation checks to guide user decision-making during operational processing.

Interface update system 102 may handle different book structures and netting jobs through flexible data processing and organizational capabilities that accommodate various operational configurations. Communication subsystem 112 may interface with multiple book structure systems and may retrieve positional data from different organizational arrangements that reflect various netting and aggregation approaches used within different operational contexts. Input processing subsystem 114 may process positional data from different book structures and may apply appropriate analysis logic that accounts for the specific netting arrangements and organizational structures used within each book structure configuration. Display update subsystem 116 may present book structure data within interface elements and may organize positional information in formats that reflect the underlying book structure arrangements and netting relationships.

The book structure handling process may involve complex data mapping and transformation procedures that normalize positional data from different organizational structures into comparable formats. Communication subsystem 112 may maintain mapping relationships between different book structure configurations and may translate positional data between different organizational formats to enable consistent analysis and comparison processes. Input processing subsystem 114 may apply book structure-specific processing logic and may account for different netting arrangements when performing positional analysis or reconciliation procedures. Display update subsystem 116 may adapt interface presentations based on book structure characteristics and may present positional data in formats that align with the specific organizational arrangements used within each book structure.

Interface update system 102 may integrate with settlement systems for producing and sending operational data through coordinated communication and data transmission capabilities. Communication subsystem 112 may establish network connections with external settlement systems and may implement communication protocols that enable data exchange between interface update system 102 and settlement platforms. Input processing subsystem 114 may prepare operational data for transmission to settlement systems and may format operational information according to settlement system requirements and data structure specifications. Communication subsystem 112 may transmit formatted operational data to settlement systems and may monitor transmission status to ensure successful data delivery and processing within the settlement platforms.

The settlement system integration process may involve comprehensive data preparation and transmission management that ensures operational data reaches settlement systems in appropriate formats and timeframes. Communication subsystem 112 may implement data transformation procedures that convert operational data from internal formats into settlement system-compatible formats that meet external system requirements. Input processing subsystem 114 may validate operational data before transmission and may ensure that data elements meet settlement system criteria and contain the appropriate information needed for settlement processing. Display update subsystem 116 may provide users with transmission status information and may present confirmation data that indicates successful data delivery to settlement systems for operational tracking and verification purposes.

Figure 6:
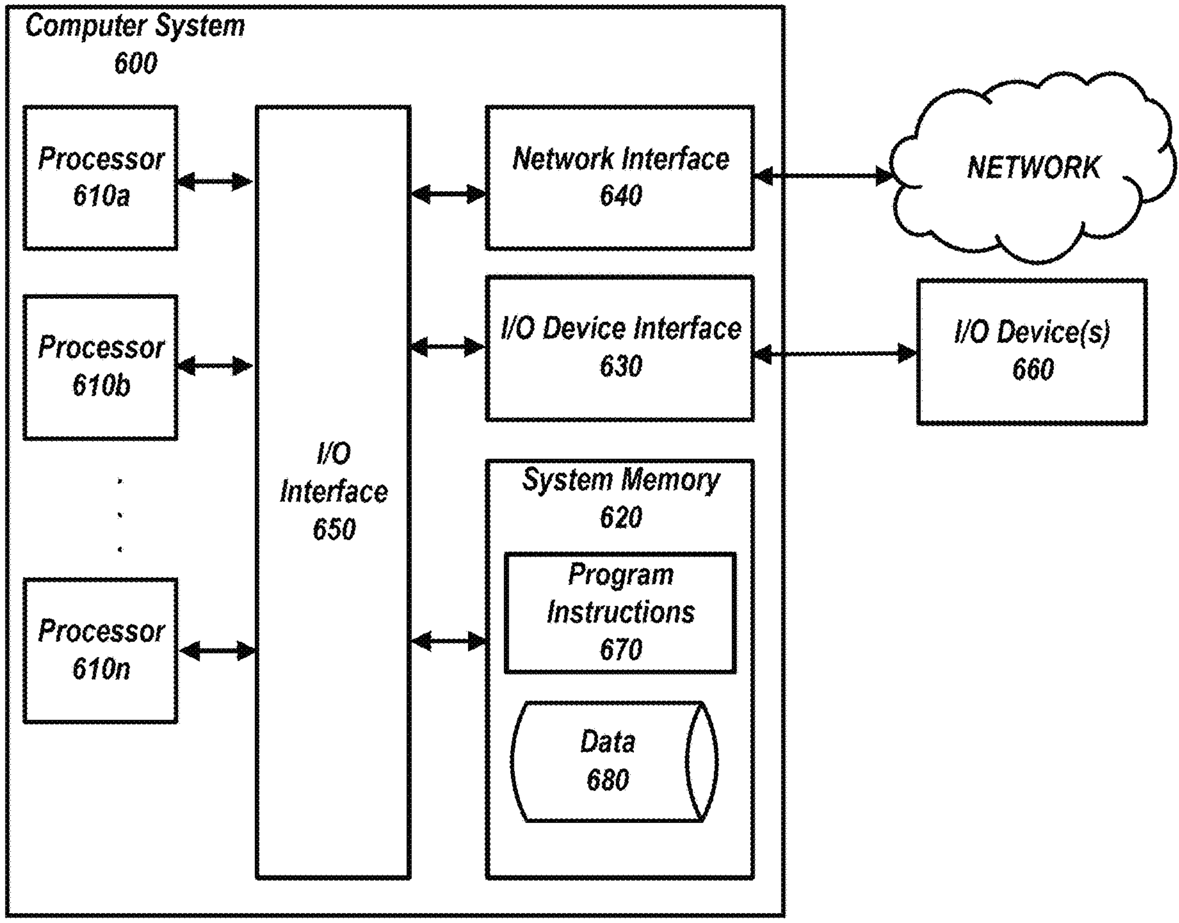
FIG. 6 is an example of a computing system, according to aspects of the present disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610$a$-610$n$) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610$a$), or a multi-processor system including any number of suitable processors (e.g., 610$a$-610$n$). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610$a$-610$n$) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610*a*-610*n*) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610*a*-610*n*, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610*a*-610*n*). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Figure 7:
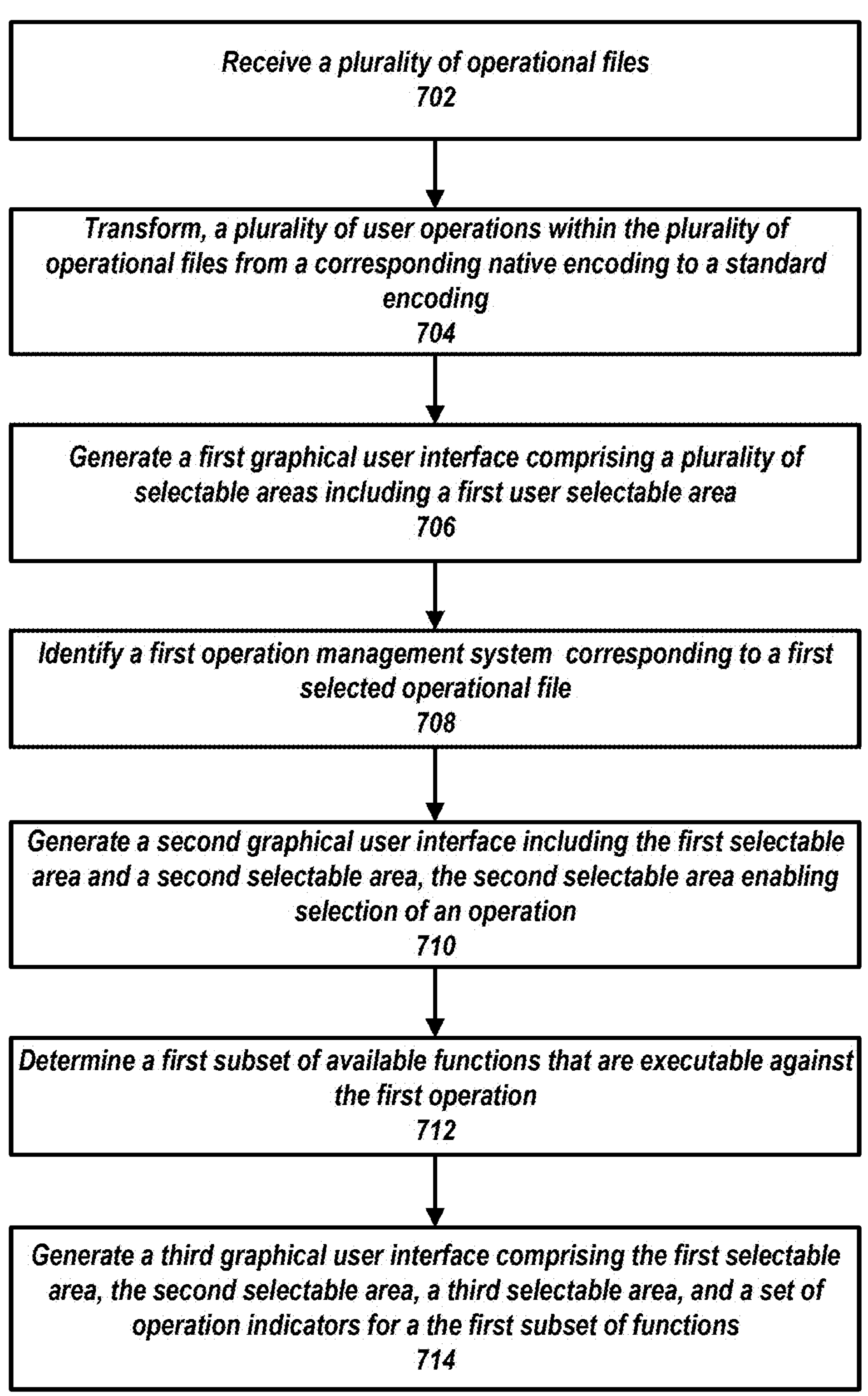
FIG. 7 is a flowchart for processing operational files and generating user interfaces, with a focus on the actions of an interface update system.

FIG. 7 illustrates a flowchart 700 for processing operational files and generating user interfaces, with a focus on the actions of interface update system 102. At 702, interface update system 102 receives a plurality of operational files from multiple operation management systems. This involves communication subsystem 112 of interface update system 102, which utilizes network interface 640 (FIG. 6) to establish connections with the operation management systems through network 150 and facilitate the receipt of operational data files containing user operations in various native formats.

At 704, interface update system 102 transforms the plurality of user operations within the plurality of operational files from a corresponding native encoding to a standard encoding. This transformation process is executed by processors 610*a*-610*n* (FIG. 6) within interface update system 102, which access the operational files stored in system memory 620 and apply data conversion algorithms to normalize the disparate data formats into a unified standard encoding structure.

At 706, interface update system 102 generates a first graphical user interface that includes a plurality of selectable areas including a first user selectable area. Display update subsystem 116 may coordinate with processors 610*a*-610*n* (FIG. 6) to render the interface elements, while I/O device interface 630 manages the presentation of the graphical user interface through connected display devices in I/O devices 660.

At 708, interface update system 102 identifies a first operation management system corresponding to a first selected operational file based on user selection. Input processing subsystem 114 may capture the user selection through I/O device interface 630 (FIG. 6), and processors 610*a*-610*n* analyze the selected file's metadata stored in system memory 620 to determine the originating operation management system.

At 710, interface update system 102 generates a second graphical user interface including the first selectable area and a second selectable area, with the second selectable area enabling selection of an operation. Display update subsystem 116 may utilize processors 610*a*-610*n* (FIG. 6) to update the interface presentation and coordinates with I/O device interface 630 to render the expanded interface through I/O devices 660.

At 712, interface update system 102 determines a first subset of available functions that are executable against the first operation. This determination process may involve processors 610*a*-610*n* (FIG. 6) accessing operation tracking data structure 300 stored in system memory 620 to evaluate function compatibility based on the identified operation management system and operation characteristics.

At 714, interface update system 102 generates a third graphical user interface comprising the first selectable area, the second selectable area, a third selectable area, and a set of operation indicators for the first subset of functions. Display update subsystem 116 may coordinate with processors 610*a*-610*n* (FIG. 6) to render the comprehensive interface elements, while I/O device interface 630 manages the presentation of both selectable and non-selectable function indicators through I/O devices 660, providing users with complete visibility into available processing capabilities.

The following examples pertain to further embodiments.

1. A method comprising: receiving from a plurality of operation management systems, a plurality of operational files, wherein each operational file of the plurality of operational files comprises a corresponding plurality of user operations; transforming, a plurality of user operations within the plurality of operational files from a corresponding native encoding to a standard encoding; generating a first graphical user interface comprising a plurality of selectable areas, wherein a first selectable area displays indicators of the plurality of operational files and enables a user selection of each operational file from the plurality of operational files received from the plurality of operation management systems; based on receiving a first user selection of a first operational file of the plurality of operational files, identifying a first operation management system of the plurality of operation management systems corresponding to the first operational file; generating a second graphical user interface comprising the first selectable area and a second selectable area, wherein the second selectable area displays a plurality of selectable operational indicators corresponding to a first plurality of operations within the first operational file; in response to receiving a second user selection, from the second selectable area, of a first selectable operation indicator associated with a first operation, determining, based on the first operation management system, a first subset of available functions that are executable against the first operation, wherein the first subset of available functions is within a set of functions; and generating a third graphical user interface comprising the first selectable area, the second selectable area, a third selectable area, and a set of operation indicators, wherein the third selectable area comprises operational details associated with the first operation, and wherein the set of operation indicators for the set of functions comprises a first subset of selectable indicators corresponding to the first subset of available functions and a second subset of non-selectable indicators corresponding to a second subset of unavailable functions that are not available to be executed against the first operation and are executable against one or more other operations.

2. The method of any of claim 1, further comprising: in response to the first user selection of the first operational file, generating for display, a third subset of selectable indicators corresponding to a third subset of available functions and a fourth subset of non-selectable indicators corresponding to a fourth set of unavailable functions that are not available to be executed against operational files from the first operation management system and are executable against other operational files from other operation management system.

3. The method of any of claims 1-2, further comprising: identifying a plurality of operations from the first operational file that do not have a corresponding counter-operation; generating for display a plurality of indicators for the plurality of operations, wherein the plurality of operations is sorted based on expiration date, and wherein each indicator of the plurality of indicators is associated with a corresponding data structure storing information related to a corresponding operation of the plurality of operations; and generating for display an option to execute a selected operation prior to the expiration date, wherein the option becomes selectable when an indicator of the plurality of indicators is selected.

4. The method of any of claims 1-3, further comprising: receiving a selection of a first indicator of the plurality of indicators; and in response to receiving the selection of the first indicator of the plurality of indicators, updating the option to become selectable and associating a first data structure corresponding to the first indicator with the option.

5. The method of any of claims 1-4, further comprising: in response to receiving a new user selection of the option, generating a command to execute a function associated with the option, wherein the command comprises the first data structure; and transmitting the command for execution over a network.

6. The method of any of claims 1-5, wherein determining the first subset of available functions that are executable against the first operation comprises: identifying, for the first operation management system, a plurality of available functions; determining a type of a plurality of types associated with the first operation; and selecting one or more available functions of the plurality of available functions that are executable against the type associated with the first operation.

7. The method of any of claims 1-6, further comprising: based on receiving a subsequent user selection of a second operational file of the plurality of operational files, identifying a second operation management system of the plurality of operation management systems corresponding to the second operational file; and resetting the second selectable area and the third selectable area, wherein resetting comprises setting the set of functions as unselectable.

8. A computer-readable medium storing instructions that, when executed by one or more processors, cause the one or more processors to perform the method of any of claims 1-7.

9. A system comprising means for performing any of embodiments 1-7.

10. A system comprising cloud-based circuitry for performing any of embodiments 1-7.

11. One or more tangible, non-transitory, computer-readable media storing instructions that, when executed by a data processing apparatus, cause the data processing apparatus to perform operations comprising those of any of embodiments 1-7.

The invention claimed is:

1. A system for enabling operation tracking using graphical interfaces, the system comprising:

one or more processors; and one or more memories configured to store instructions that when executed by the one or more processors perform operations comprising:

receiving, from a plurality of operation management systems, a plurality of operational files, wherein each operational file of the plurality of operational files comprises a corresponding plurality of user operations;

transforming a plurality of user operations within the plurality of operational files from a corresponding native encoding to a standard encoding;

generating a first graphical user interface comprising a plurality of selectable areas, wherein a first selectable area of the plurality of selectable areas displays indicators of the plurality of operational files and enables a user selection of each operational file from the plurality of operational files received from the plurality of operation management systems;

based on receiving a first user selection of a first operational file of the plurality of operational files, identifying a first operation management system of the plurality of operation management systems corresponding to the first operational file, wherein the first operational file is selected from the first selectable area;

generating a second graphical user interface comprising the first selectable area and a second selectable area, wherein the second selectable area displays a plurality of selectable operational indicators corresponding to a first plurality of operations within the first operational file;

in response to receiving a second user selection of a first selectable operation indicator associated with a first operation, determining, based on the first operation management system, a first subset of available functions that are executable against the first operation, wherein the first subset of available functions is within a set of functions, wherein the second user selection is from the second selectable area; and generating a third graphical user interface comprising the first selectable area, the second selectable area, a third selectable area, and a set of operation indicators, wherein the third selectable area comprises operational details associated with the first operation, and wherein the set of operation indicators for the set of functions comprises a first subset of selectable indicators corresponding to the first subset of available functions and a second subset of non-selectable indicators corresponding to a second subset of unavailable functions that are not available to be executed against the first operation and are executable against one or more other operations.

2. The system of claim 1, wherein the instructions further cause the one or more processors to perform operations comprising:

in response to the first user selection of the first operational file, generating for display, a third subset of selectable indicators corresponding to a third subset of available functions and a fourth subset of non-selectable indicators corresponding to a fourth subset of unavailable functions that are not available to be executed against operational files from the first operation management system and are executable against other operational files from other operation management system.

3. The system of claim 1, wherein the instructions further cause the one or more processors to perform operations comprising:

identifying a plurality of operations from the first operational file that do not have a corresponding counter-operation;

generating for display a plurality of indicators for the plurality of operations, wherein the plurality of operations is sorted based on expiration date, and wherein each indicator of the plurality of indicators is associated with a corresponding data structure storing information related to a corresponding operation of the plurality of operations; and generating, for display, an option to execute a selected operation prior to the expiration date, wherein the option becomes selectable when an indicator of the plurality of indicators is selected.

4. The system of claim 3, wherein the instructions further cause the one or more processors to perform operations comprising:

receiving a selection of a first indicator of the plurality of indicators; and in response to receiving the selection of the first indicator of the plurality of indicators, updating the option to become selectable and associating a first data structure corresponding to the first indicator with the option.

5. The system of claim 4, wherein the instructions further cause the one or more processors to perform operations comprising:

in response to receiving a new user selection of the option, generating a command to execute a function associated with the option, wherein the command comprises the first data structure; and transmitting the command for execution over a network.

6. The system of claim 1, wherein the instructions for determining the first subset of available functions that are executable against the first operation further cause the one or more processors to perform operations comprising:

identifying, for the first operation management system, a plurality of available functions;

determining a type of a plurality of types associated with the first operation; and selecting one or more available functions of the plurality of available functions that are executable against the type associated with the first operation.

7. The system of claim 6, wherein the instructions further cause the one or more processors to perform operations comprising:

based on receiving a subsequent user selection of a second operational file of the plurality of operational files, identifying a second operation management system of the plurality of operation management systems corresponding to the second operational file; and resetting the second selectable area and the third selectable area, wherein resetting comprises setting the set of functions as unselectable.

8. A method for enabling operation tracking using graphical interfaces, the method comprising:

receiving, from a plurality of operation management systems, a plurality of operational files, wherein each operational file of the plurality of operational files comprises a corresponding plurality of user operations;

transforming a plurality of user operations within the plurality of operational files from a corresponding native encoding to a standard encoding;

generating a first graphical user interface comprising a plurality of selectable areas, wherein a first selectable area of the plurality of selectable areas displays indicators of the plurality of operational files and enables a user selection of each operational file from the plurality of operational files received from the plurality of operation management systems;

based on receiving a first user selection of a first operational file of the plurality of operational files, identifying a first operation management system of the plurality of operation management systems corresponding to the first operational file, wherein the first operational file is selected from the first selectable area;

generating a second graphical user interface comprising the first selectable area and a second selectable area, wherein the second selectable area displays a plurality of selectable operational indicators corresponding to a first plurality of operations within the first operational file;

in response to receiving a second user selection of a first selectable operation indicator associated with a first operation, determining, based on the first operation management system, a first subset of available functions that are executable against the first operation, wherein the first subset of available functions is within a set of functions; and generating a third graphical user interface comprising the first selectable area, the second selectable area, a third selectable area, and a set of operation indicators, wherein the third selectable area comprises operational details associated with the first operation, and wherein the set of operation indicators for the set of functions comprises a first subset of selectable indicators corresponding to the first subset of available functions and a second subset of non-selectable indicators corresponding to a second subset of unavailable functions that are not available to be executed against the first operation and are executable against one or more other operations.

9. The method of claim 8, further comprising:

in response to the first user selection of the first operational file, generating for display, a third subset of selectable indicators corresponding to a third subset of available functions and a fourth subset of non-selectable indicators corresponding to a fourth subset of unavailable functions that are not available to be executed against operational files from the first operation management system and are executable against other operational files from other operation management system.

10. The method of claim 8, further comprising:

identifying a plurality of operations from the first operational file that do not have a corresponding counter-operation;

generating for display a plurality of indicators for the plurality of operations, wherein the plurality of operations is sorted based on expiration date, and wherein each indicator of the plurality of indicators is associated with a corresponding data structure storing information related to a corresponding operation of the plurality of operations; and generating for display an option to execute a selected operation prior to the expiration date, wherein the option becomes selectable when an indicator of the plurality of indicators is selected.

11. The method of claim 10, further comprising:

receiving a selection of a first indicator of the plurality of indicators; and in response to receiving the selection of the first indicator of the plurality of indicators, updating the option to become selectable and associating a first data structure corresponding to the first indicator with the option.

12. The method of claim 11, further comprising:

in response to receiving a new user selection of the option, generating a command to execute a function associated with the option, wherein the command comprises the first data structure; and transmitting the command for execution over a network.

13. The method of claim 8, wherein determining the first subset of available functions that are executable against the first operation comprises:

identifying, for the first operation management system, a plurality of available functions;

determining a type of a plurality of types associated with the first operation; and selecting one or more available functions of the plurality of available functions that are executable against the type associated with the first operation.

14. The method of claim 13, further comprising:

based on receiving a subsequent user selection of a second operational file of the plurality of operational files, identifying a second operation management system of the plurality of operation management systems corresponding to the second operational file; and resetting the second selectable area and the third selectable area, wherein resetting comprises setting the set of functions as unselectable.

15. One or more non-transitory, computer-readable media storing instructions thereon that when executed by one or more processors, cause the one or more processors to perform operations comprising:

receiving, from a plurality of operation management systems, a plurality of operational files, wherein each operational file of the plurality of operational files comprises a corresponding plurality of user operations;

transforming a plurality of user operations within the plurality of operational files from a corresponding native encoding to a standard encoding;

generating a first graphical user interface comprising a plurality of selectable areas, wherein a first selectable area of the plurality of selectable areas displays indicators of the plurality of operational files and enables a user selection of each operational file from the plurality of operational files received from the plurality of operation management systems;

based on receiving a first user selection of a first operational file of the plurality of operational files, identifying a first operation management system of the plurality of operation management systems corresponding to the first operational file, wherein the first operational file is selected from the first selectable area;

generating a second graphical user interface comprising the first selectable area and a second selectable area, wherein the second selectable area displays a plurality of selectable operational indicators corresponding to a first plurality of operations within the first operational file;

in response to receiving a second user selection, from the second selectable area, of a first selectable operation indicator associated with a first operation, determining, based on the first operation management system, a first subset of available functions that are executable against the first operation, wherein the first subset of available functions is within a set of functions; and generating a third graphical user interface comprising the first selectable area, the second selectable area, a third selectable area, and a set of operation indicators, wherein the third selectable area comprises operational details associated with the first operation, and wherein the set of operation indicators for the set of functions comprises a first subset of selectable indicators corresponding to the first subset of available functions and a second subset of non-selectable indicators corresponding to a second subset of unavailable functions that are not available to be executed against the first operation and are executable against one or more other operations.

16. The one or more non-transitory, computer-readable media of claim 15, wherein the instructions further cause the one or more processors to perform operations comprising:

in response to the first user selection of the first operational file, generating for display, a third subset of selectable indicators corresponding to a third subset of available functions and a fourth subset of non-selectable indicators corresponding to a fourth subset of unavailable functions that are not available to be executed against operational files from the first operation management system and are executable against other operational files from other operation management system.

17. The one or more non-transitory, computer-readable media of claim 15, wherein the instructions further cause the one or more processors to perform operations comprising:

identifying a plurality of operations from the first operational file that do not have a corresponding counter-operation;

generating for display a plurality of indicators for the plurality of operations, wherein the plurality of operations is sorted based on expiration date, and wherein each indicator of the plurality of indicators is associated with a corresponding data structure storing information related to a corresponding operation of the plurality of operations; and generating for display an option to execute a selected operation prior to the expiration date, wherein the option becomes selectable when an indicator of the plurality of indicators is selected.

18. The one or more non-transitory, computer-readable media of claim 17, wherein the instructions further cause the one or more processors to perform operations comprising:

receiving a selection of a first indicator of the plurality of indicators; and in response to receiving the selection of the first indicator of the plurality of indicators, updating the option to become selectable and associating a first data structure corresponding to the first indicator with the option.

19. The one or more non-transitory, computer-readable media of claim 18, wherein the instructions further cause the one or more processors to perform operations comprising:

in response to receiving a new user selection of the option, generating a command to execute a function associated with the option, wherein the command comprises the first data structure; and transmitting the command for execution over a network.

20. The one or more non-transitory, computer-readable media of claim 15, wherein the instructions for determining that the first subset of available functions that are executable against the first operation cause the one or more processors to perform operations comprising:

identifying, for the first operation management system, a plurality of available functions;

determining a type of a plurality of types associated with the first operation; and selecting one or more available functions of the plurality of available functions that are executable against the type associated with the first operation.

* * * * *